E. A. COUCH.
Manufacture of Flower-Pots.
No. 216,311. Patented June 10, 1879.
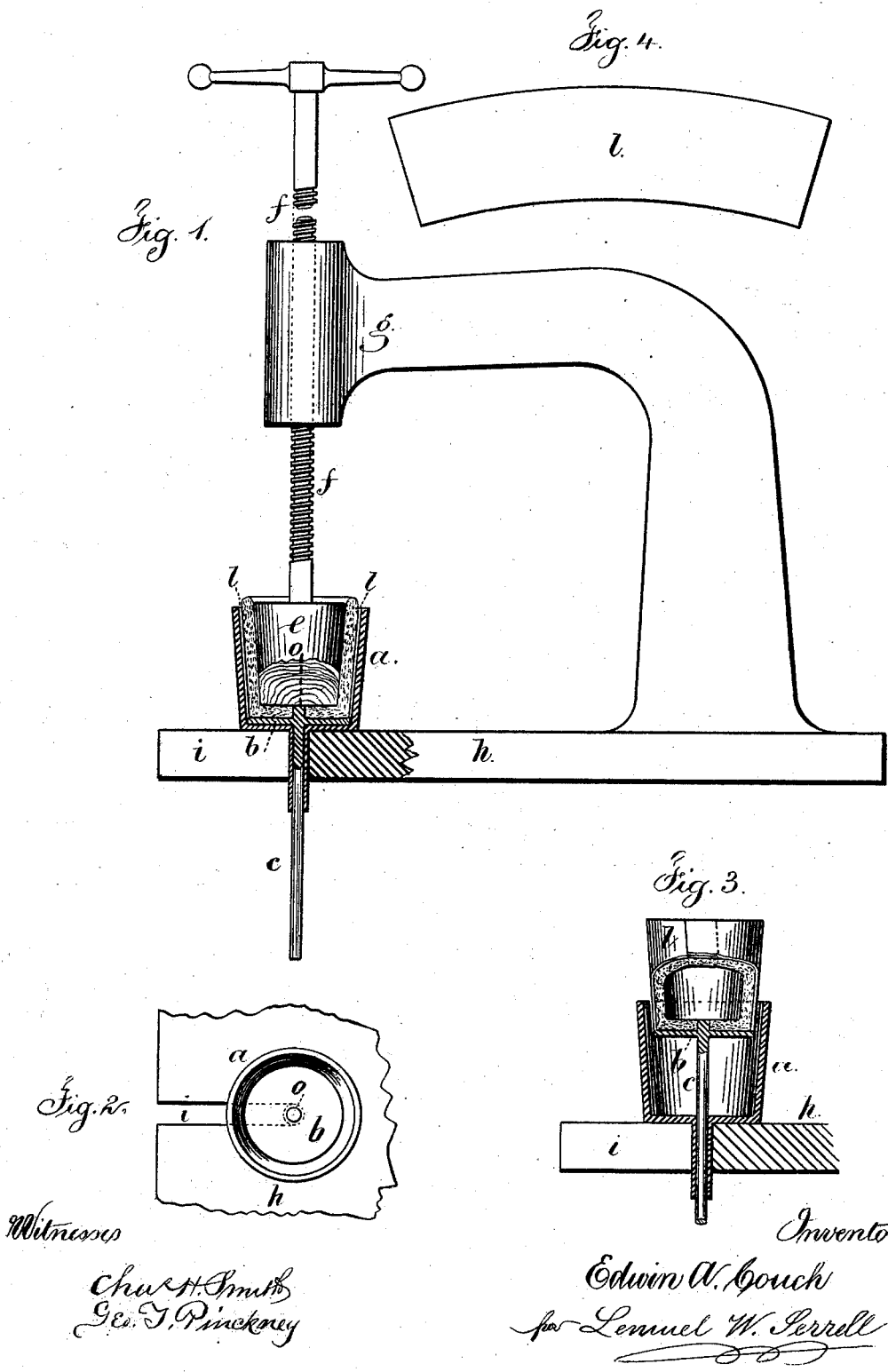

UNITED STATES PATENT OFFICE.

EDWIN A. COUCH, OF PLAINFIELD, NEW JERSEY.

IMPROVEMENT IN THE MANUFACTURE OF FLOWER-POTS.

Specification forming part of Letters Patent No. 216,311, dated June 10, 1879; application filed March 10, 1879.

*To all whom it may concern:*

Be it known that I, EDWIN A. COUCH, of Plainfield, in the county of Union and State of New Jersey, have invented an Improvement in the Manufacture of Flower-Pots, of which the following is a specification.

Flower-pots have been pressed in a mold and raised therefrom by a pusher upon a tube that passes through the bottom of the mold, and propagating-pots have been made of earth mixed with a fertilizer, such as cow-dung.

My invention is for facilitating the manufacture of the pots from garden-soil, earth, or similar material having sufficient tenacity to retain its shape during the ordinary operation of propagation, such pot losing its consistency when placed in the earth, so that the plant, when set out, remains in the earth of the pot, its roots are not disturbed, and the growth continues through the material that formed the pot.

In the drawings, Figure 1 is a side view, partially in section, of the molding apparatus. Fig. 2 is a plan view, and Fig. 3 is a section of the pot as ejected from the mold.

The mold $a$ is of a size and shape to form the outside of the pot. In the bottom of this mold are a disk, $b$, and a spindle, $c$, which jointly form the pusher to raise the pot from the mold.

The plunger $e$ is upon the end of a screw, $f$, that passes through a standard, $g$, rising above the bed $h$; and in the bed there is a slot, $i$, for the reception of the spindle $c$, to guide such mold $a$ to its place beneath the plunger, and to allow the mold to sit firmly upon the bed $h$.

I provide a paper lining, $l$, of a size and shape to fit the inside of the mold, with the ends lapping. This is represented in Fig. 4.

I prepare garden-soil or earth of the proper consistency and moisture for molding into pots. A small quantity of clay or adhesive material may be added if the earth is not of the proper character for the pots.

The lining $l$ is placed in the mold $a$, and a suitable quantity of the earth for the pot is put into such mold, and the mold placed in its position, and the plunger screwed down to form the inside of the pot and consolidate the material. It is preferable to employ the pin $o$ upon the pusher to determine the point to which the plunger is screwed down, and at the same time to form the hole in the bottom of the pot. After applying the pressure the plunger is run up, and I remark that I prefer a plunger of wood, fastened upon and revolved with the screw, because it does not draw the pot out of shape by any suction action as it is run up. With smooth metal plungers the soft material of the pot sometimes adheres by the atmospheric pressure. After the plunger has been screwed up, the mold and pot are removed, the surplus earth projecting above the mold is cut off, and the pusher employed to raise the pot from the mold, as illustrated in Fig. 3, and the complete pot is lifted off and placed in a suitable place to dry and harden.

The paper lining prevents the plastic earth adhering to the mold, and said paper lining becomes an envelope for the pot to support the same while being hardened; and said lining, being a rapid absorbent of moisture, causes the earthy material of which the pot is made to set quickly; and I place said pots in the sunshine or in artificial heat to dry, and after the pot is sufficiently dry the paper can be removed and used again.

It is preferable to use three molds with one press, and to provide sufficient paper linings to allow the operations to be continuous and the men to work without delay.

I do not limit myself to paper only as a lining, as canvas or similar flexible material would answer as well.

I claim as my invention—

1. In combination with the mold for the pot, a wooden plunger attached to and revolved with the actuating-screw, a lining to the mold of paper or similar material, and a pusher in the bottom of the mold, having a pin to regulate the thickness of the pot, and a spindle projecting through the bottom of the mold, as set forth.

2. A flat bed to receive the mold, having a slot for the reception of the spindle $c$, in combination with the mold, spindle, pusher, plunger, and actuating-screw, substantially as set forth, so that the mold can be removed or replaced under the plunger with facility, as set forth.

Signed by me this 4th day of March, A. D. 1879.

EDWIN ALBERT COUCH.

Witnesses:
LEMUEL W. SERRELL,
ELIZA J. SERRELL.